(12) United States Patent
Fry

(10) Patent No.: US 9,160,838 B2
(45) Date of Patent: Oct. 13, 2015

(54) CELL-PHONE-BASED VEHICLE LOCATOR AND "PATH BACK" NAVIGATOR

(76) Inventor: William R. Fry, Colorado Springs, CO (US)

( * ) Notice: Subject to any disclaimer, the term of this patent is extended or adjusted under 35 U.S.C. 154(b) by 2025 days.

(21) Appl. No.: 12/144,193

(22) Filed: Jun. 23, 2008

(65) Prior Publication Data

US 2008/0318598 A1  Dec. 25, 2008

Related U.S. Application Data

(60) Provisional application No. 60/945,440, filed on Jun. 21, 2007.

(51) Int. Cl.
*H04W 24/00* (2009.01)
*H04M 1/725* (2006.01)
*B60R 25/24* (2013.01)
*G01S 19/14* (2010.01)
*G08G 1/005* (2006.01)
*G08G 1/00* (2006.01)

(52) U.S. Cl.
CPC ........... *H04M 1/72572* (2013.01); *B60R 25/24* (2013.01); *G01S 19/14* (2013.01); *G08G 1/005* (2013.01); *G08G 1/205* (2013.01); *B60R 2325/205* (2013.01); *H04M 2250/10* (2013.01)

(58) Field of Classification Search
CPC .... B60R 25/24; B60R 25/00; B60R 2325/205
USPC ...................................................... 455/456.5
See application file for complete search history.

(56) References Cited

U.S. PATENT DOCUMENTS

| 6,021,371 | A | * | 2/2000 | Fultz | 701/200 |
| 6,590,534 | B1 | | 7/2003 | Kroll et al. | |
| 2008/0167806 | A1 | * | 7/2008 | Wheeler et al. | 701/208 |
| 2008/0246654 | A1 | * | 10/2008 | Cheng | 342/357.06 |
| 2010/0207754 | A1 | * | 8/2010 | Shostak et al. | 340/450 |

* cited by examiner

*Primary Examiner* — Khalid Shaheed
(74) *Attorney, Agent, or Firm* — Gifford, Krass, Sprinkle, Anderson & Citkowski, P.C.

(57) ABSTRACT

A hand-held, portable navigation system and method are integrated within a cellular telephone enclosure, resulting in a simplified architecture with fewer buttons to press and items to carry. The apparatus uses a cellular telephone having a microphone, a keypad, GPS receiver, a display, a memory, an earphone, a wireless transceiver, and a processor. The processor is programmed to receive a command through a user input device to determine the initial location of the user and activate the GPS receiver to obtain positional coordinates associated with the initial location. The coordinates are then stored in the memory. A subsequent command through a user input device causes the processor to determine the new location of the user, and the GPS receiver is again activated to obtain positional coordinates of the new location. The processor is further programmed to provide guidance to the user based upon the coordinates of the initial location and the new location enabling the user to return to the initial location from the new location. The user input device may be a portable wireless keyless entry device such as a 'fob,' in which case the processor is further operative to receive and store a vehicular DOOR LOCK command in memory, and determine the initial location of the user when the DOOR LOCK command is received and recognized by the telephone.

7 Claims, 2 Drawing Sheets

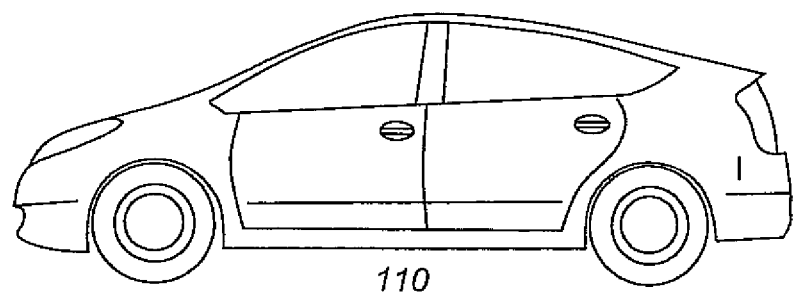
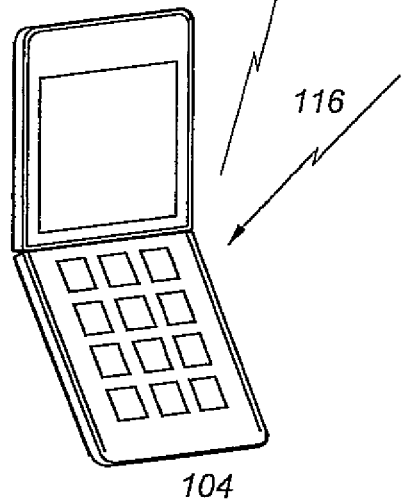
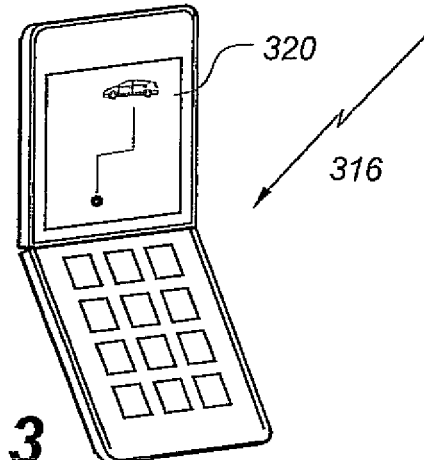
*Fig - 2*
*Fig - 3*

CELL-PHONE-BASED VEHICLE LOCATOR AND "PATH BACK" NAVIGATOR

REFERENCE TO RELATED APPLICATION

This application claims priority from U.S. Provisional Patent Application Ser. No. 60/945,440, filed Jun. 21, 2007, the entire content of which is incorporated herein by reference.

FIELD OF THE INVENTION

This invention relates generally to navigation and, in particular, to a cell-hone-based system and method for finding a "path back" to a previous location, including the location of a parked vehicle.

BACKGROUND OF THE INVENTION

There is nothing more frustrating than forgetting where you parked you car. For this reason, numerous vehicle locator systems have been proposed. Some of these involve the use of cell phones. The problems with existing approaches, however, is that they require significant changes in existing infrastructures.

One example is disclosed in U.S. Pat. No. 6,590,534. The system proposes a small hand-held locator for the automobile operator which will attach to a key chain or fit in a wallet, pocket, or purse. This small portable unit will communicate with a unit attached to an automobile to enable the operator to locate the automobile. Once the portable unit senses that it is leaving the car unit it will request a position estimate from the car unit. The car unit will feed its position information to a modulation circuit which will use the antenna to transmit this information to the handheld unit. The handheld unit has an antenna and a receiver circuit to capture this information. This position estimate will be stored, in both the car unit and the handheld unit, for the duration of the operation and used upon return.

In an alternative embodiment, the portable unit will continuously update its own location independently of the car unit. With this embodiment there is not need for the portable unit to sense that it is leaving the car unit in order to store the car location. The operator can merely push a button to request that the location be stored. Alternatively, the portable unit is the only unit and the car unit is dispensed with altogether. The portable unit would then continuously update the position until the operator signaled that they had parked. The portable unit would then store the parking position. Upon return, the operator must turn on the portable unit. The portable unit will then attempt to acquire a GPS signal to determine position. It will retrieve the car location from memory and calculate a return bearing and display that bearing to the operator. As long as the GPS signal is good it will continue to calculate a return bearing to display to the operator.

SUMMARY OF THE INVENTION

This invention resides in a hand-held portable navigation system and method contained in a cellular telephone enclosure. This results in a simplified architecture with fewer buttons to press and items to carry. The apparatus uses a cellular telephone having a microphone, a keypad, GPS receiver, a display, a memory, an earphone, a wireless transceiver, and a processor. The processor is programmed to receive a command through a user input device to determine the initial location of the user and activate the GPS receiver to obtain positional coordinates associated with the initial location. The coordinates are then stored in the memory.

A subsequent command through a user input device causes the processor to determine the new location of the user, and the GPS receiver is again activated to obtain positional coordinates of the new location. The processor is further programmed to provide guidance to the user based upon the coordinates of the initial location and the new location enabling the user to return to the initial location from the new location.

The guidance may be provided to the user on the display of the cellular telephone, for example, in the form of a graphical route on the display of the cellular telephone. The route may superimposed on a map on the display of the cellular telephone, with period GPS downloads being used to update the user's location on the display. The map may be previously stored in the cellular telephone, or downloaded into the cellular telephone when the subsequent command is received. The guidance may also be provided to the user with voice prompts through the earphone.

The user input device may be the keypad, the microphone of the cell phone, or a portable wireless keyless entry device such as a 'fob.' In this embodiment, the processor is further operative to receive and store a vehicular DOOR LOCK command in memory, and determine the initial location of the user when the DOOR LOCK command is received and recognized by the telephone. The DOOR LOCK command may be received from an existing wireless keyless entry system or through a cellular telephone network or other wireless network.

A vehicle locator system according to the invention includes a cell phone having a GPS receiver, a display, an earphone, and a wireless transceiver. The system is operative to learn one or more keyless entry commands, transmit one of the commands and store GPS-based location information, and provide the user with information regarding the location upon request. The transmitted command may be in the form of a DOOR LOCK signal, with the cell phone providing the user with information regarding the location using a route or other indicators on the display or through the earphone.

BRIEF DESCRIPTION OF THE DRAWINGS

FIG. 2 is a drawing that illustrates an alternative embodiment of the invention; and FIG. 3 is a drawing of a cell phone showing a possible return trip navigator.

DETAILED DESCRIPTION OF THE INVENTION

Figure 1:
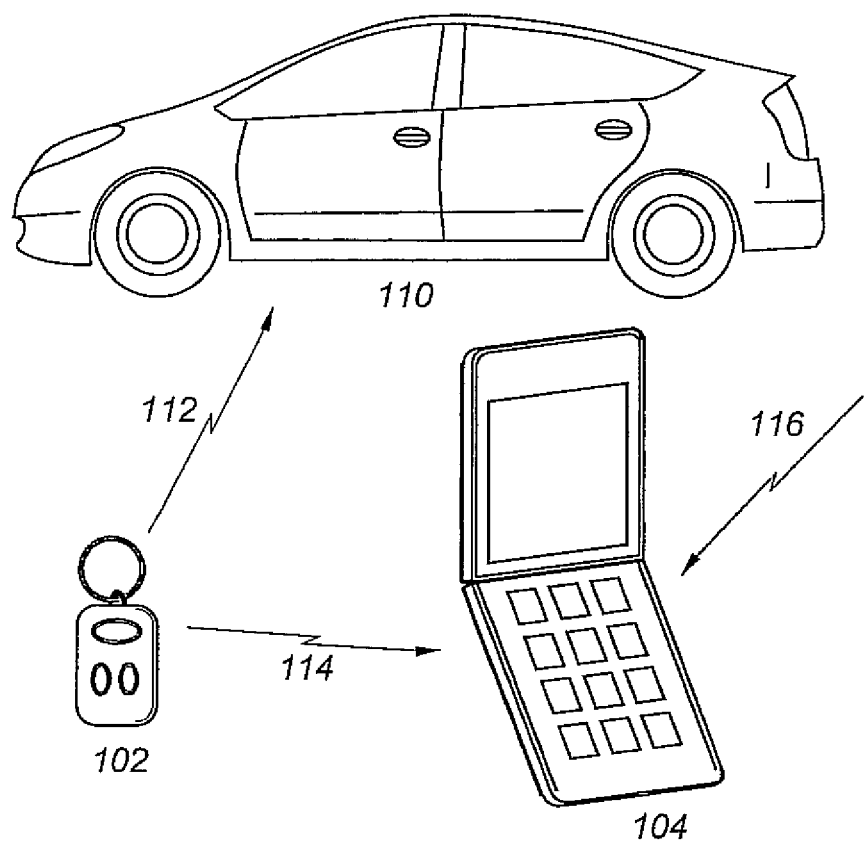
FIG. 1 is a drawing that illustrates the preferred embodiment of the invention.

FIG. 1 illustrates one embodiment of the invention wherein a user carries both a keyless entry fob 102 and cell phone 104. When the user presses the DOOR LOCK button on the fob 102, the signal 112 is received by car 110 and is also received by phone 104. This causes phone 104 to automatically acquire location information via signal(s) 116 from the GPS network, and the phone 104 stores the location in memory.

The phone 104 could be programmed to "learn" the user's DOOR LOCK command, or it may be entered in other ways. For example, it may be downloaded through the cell phone infrastructure after the user enters the ID of the fob or other security information. Alternatively, a Bluetooth connection between the fob and phone 104.

When the user later wishes to locate the vehicle, a button is pushed on the phone and another GPS fix is obtained. This allows the phone to display a route on its display as shown in FIG. 3. The route may be superimposed on a map, with an icon being used to show the user's progress in returning to the vehicle, much the same as with vehicle navigators. The map data may either be previously stored in the phone, or downloaded from the cell phone or other client-server network by way of a subscription service, for example, at the time the return request is generated.

As an alternate to the mapped route of FIG. 3, directional arrows or other visual indicators may be used. As further alternative, the phone could "tell" the user which way to go through the earpiece, such that the user simply looks like they are having a phone conversation. For example, the phone could tell the user to "continue on this street for another two blocks," or proceed north for another two blocks," etc. This would require the cell phone to have an electronic compass which is a minor addition.

FIG. 2 is a drawing that illustrates a preferred embodiment of the invention, wherein the cell phone itself transmits commands to the vehicle directly, allowing a user to carry a single piece of equipment. Again, when the DOOR LOCK command is entered, preferably using a multi-key sequence known only to authorized users, a GPS fix is automatically obtained and used as described above to lead the user back to their vehicle. Upon arrival, another multi-key sequence may be entered to unlock the car. As an alternative to the entry of a user code, a fingerprint, voiceprint, picture ID, or proximity detection system (passive remote keyless entry) may be used for authentication. That is, the user may "train" the phone a priori with their own image or voice command (i.e., "unlock the car") at which time the appropriate GPS fix will be acquired and LOCK/UNLOCK commands transmitted.

Since, in the preferred embodiment, a GPS fix is automatically obtained when a button or key sequence is entered, the invention is not limed to the use of finding a parked car. That is, the phone may be used to find the way back to any previous location, whether on foot or in a vehicle. The user need only obtain an initial GPS fix indicative of the place to return to, followed by a subsequent return request, which will show or tell the back. In this way, the invention resembles a cellphone-based "electronic breadcrumb" system and method.

All embodiments of this invention have two modes of operation. According to the first mode, GPS position fixes are obtained at the beginning and end of a journey but not en route. In this mode, the system decides the route back, typically using the shortest route. This mode is useful when the user meanders around and comes closer to the original departure point. According to a second mode of operation, GPS fixes are obtained on a periodic basis en route, allowing the user to tale the exact path back. This mode is particularly useful if the user lost something or wanted to return to a particular landmark along the way.

I claim:

1. A hand-held portable navigation system, comprising:
    a cellular telephone having a microphone, a keypad, GPS receiver, a display, a memory, an earphone, a wireless transceiver and a processor programmed to perform the following functions:
    a) receive a command through the keypad, microphone or other user input device associated with the cellular telephone to determine the initial location of the user,
    b) activate the GPS receiver to obtain positional coordinates associated with the initial location,
    c) store the coordinates in the memory,
    d) receive a subsequent command through a user input device to determine the new location of the user,
    e) activate the GPS receiver to obtain positional coordinates of the new location,
    f) provide guidance to the user based upon the coordinates of the initial location and the new location enabling the user to return to the initial location from the new location, and
    g) receive and store a vehicular DOOR LOCK command in the memory of the cell phone; and
    wherein the command received through the user input device to determine the initial location of the user also causes the transmission of the DOOR LOCK command.

2. The hand-held portable navigation system of claim 1, wherein the DOOR LOCK command is received from an existing wireless keyless entry system.

3. The hand-held portable navigation system of claim 1, wherein the DOOR LOCK command is received from a cellular telephone network or other wireless network.

4. A vehicle locator, comprising:
    a cell phone having a GPS receiver, a display, an earphone, and a wireless transceiver, the cell phone being operative to:
    a) learn one or more keyless entry commands,
    b) transmit one of the commands and store GPS-based location information, and
    c) provide the user with information regarding the location upon request.

5. The vehicle locator of claim 4, wherein the transmitted command is in the form of a DOOR LOCK signal.

6. The vehicle locator of claim 4, wherein the cell phone provides the user with information regarding the location using a route or other indicators on its display.

7. The vehicle locator of claim 4, wherein the cell phone provides the user with information regarding the location through the earphone.

* * * * *